J. GLASS.
Rolls for Rolling Wagon-Hub Bands.
No. 141,641. Patented August 12, 1873.
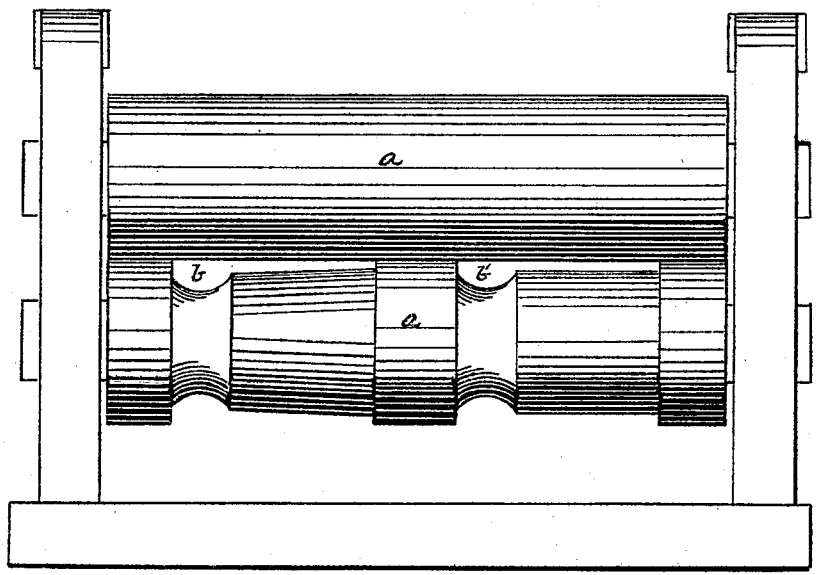
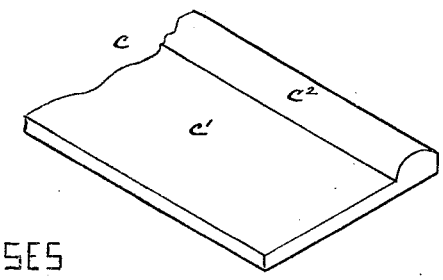
Witnesses
E. C. Fitler
R. E. Henderson
Inventor
John Glass
by Bakewell Christy & Kerr
his attorneys

UNITED STATES PATENT OFFICE.

JOHN GLASS, OF PITTSBURG, PENNSYLVANIA, ASSIGNOR TO WILSON, GLASS & COMPANY, OF SAME PLACE.

IMPROVEMENT IN ROLLS FOR ROLLING WAGON-HUB BANDS.

Specification forming part of Letters Patent No. 141,641, dated August 12, 1873; application filed May 19, 1873.

*To all whom it may concern:*

Be it known that I, JOHN GLASS, of Pittsburg, in the county of Allegheny and State of Pennsylvania, have invented a new and useful Improvement in Rolls for Rolling Iron; and I do hereby declare the following to be a full, clear, and exact description thereof, reference being had to the accompanying drawing, which forms a part of this specification, and which shows my improvement by a front elevation.

My invention consists in an improvement in rolls for rolls for rolling hub-bands and other blanks.

To enable others skilled in the art to make and use my invention, I will describe the same more fully.

I make a pair of rolls, $a$—the upper one plain and the lower one having a groove, $b$—of such shape as to form a blank, $c$. The blank $c$ has a flat part, $c^1$, and along the upper side of one edge a convex bead or rib, $c^2$. This form is produced on continuous bars of iron, which, being previously heated, are passed through—first through the groove $b$, and then through the finishing-groove $b'$.

The use to which I put this peculiar shape of bar or blank is to make bands for wagon-hubs.

Heretofore such bands have been made by first encircling the hub with a flat iron band, and then by encircling such band with a piece of half-round iron rod, which is shrunk on the band, thus forming a hub-band of much the same shape as I now produce by rolling.

I also use these bars for encircling tanks of various descriptions. Besides this, it may be applied to various other uses, which I will not now mention.

What I claim as my invention, and desire to secure by Letters Patent, is—

A pair of rolls, $a$, one of which is plain and the other is provided with a groove, $b$, of the shape shown, for producing the blank $c$, substantially as described.

In testimony whereof I, the said JOHN GLASS, have hereunto set my hand.

JOHN GLASS.

Witnesses:
 JAS. B. GLASS,
 T. B. KERR.